(12) United States Patent
Von Elbwart et al.

(10) Patent No.: US 8,737,301 B2
(45) Date of Patent: May 27, 2014

(54) CHANNEL QUALITY FEEDBACK SIGNALING IN COMMUNICATION SYSTEMS

(75) Inventors: Alexander Golitschek Edler Von Elbwart, Langen (DE); Christian Wengerter, Langen (DE)

(73) Assignee: Panasonic Corporation, Osaka (JP)

( * ) Notice: Subject to any disclaimer, the term of this patent is extended or adjusted under 35 U.S.C. 154(b) by 271 days.

(21) Appl. No.: 13/256,493

(22) PCT Filed: Dec. 22, 2009

(86) PCT No.: PCT/EP2009/009226
§ 371 (c)(1),
(2), (4) Date: Oct. 10, 2011

(87) PCT Pub. No.: WO2010/105653
PCT Pub. Date: Sep. 23, 2010

(65) Prior Publication Data
US 2012/0106450 A1 May 3, 2012

(30) Foreign Application Priority Data

Mar. 16, 2009 (EP) .................................... 09003787

(51) Int. Cl.
*H04W 4/00* (2009.01)
(52) U.S. Cl.
USPC .......................................... 370/328; 370/329
(58) Field of Classification Search
CPC ..... H04W 80/04; H04W 84/12; H04W 88/06; H04W 88/08; H04W 84/18
USPC ......... 370/328, 329, 332, 333, 252, 310–350; 375/241, 242; 714/707, 755
See application file for complete search history.

(56) References Cited

U.S. PATENT DOCUMENTS

2006/0072510 A1* 4/2006 Aizawa ......................... 370/333
2006/0223449 A1 10/2006 Sampath et al.
(Continued)

FOREIGN PATENT DOCUMENTS

CN 1941682 A 4/2007
CN 101180820 A 5/2008
(Continued)

OTHER PUBLICATIONS

U.S. Appl. No. 61/106,847, Oct. 2008, Bala et al.*

(Continued)

*Primary Examiner* — Robert C Scheibel
*Assistant Examiner* — Siren Wei
(74) *Attorney, Agent, or Firm* — Pearne & Gordon LLP

(57) ABSTRACT

The invention relates to a message for reporting a channel quality of a communication system, a corresponding method and apparatuses performing such method. The invention is inter alia applicable to a 3GPP LTE and LTE-A system as standardized by the 3$^{rd}$ Generation Partnership Project (3GPP). The invention provides a structure (message) that allows conveying channel quality information in a manner allowing an unambiguous identification of the size channel quality information. This is achieved by defining a message comprising a first channel quality field consisting of a known number of bits, and a second channel quality field consisting of a variable number of bits. The number of bits and structure (of the content of the bits) of the second channel quality field is indicated by the content of the bits of the first channel quality field.

24 Claims, 8 Drawing Sheets

(56) References Cited

U.S. PATENT DOCUMENTS

| | | | |
|---|---|---|---|
| 2007/0026808 A1* | 2/2007 | Love et al. | 455/67.7 |
| 2008/0080465 A1* | 4/2008 | Pajukoski et al. | 370/342 |
| 2008/0212464 A1* | 9/2008 | Kim et al. | 370/210 |
| 2008/0285477 A1* | 11/2008 | Kuroda et al. | 370/252 |
| 2009/0028260 A1* | 1/2009 | Xiao et al. | 375/260 |
| 2009/0046805 A1* | 2/2009 | Kim et al. | 375/295 |
| 2009/0052405 A1* | 2/2009 | Ko et al. | 370/335 |
| 2009/0073922 A1* | 3/2009 | Malladi et al. | 370/328 |
| 2009/0201825 A1* | 8/2009 | Shen et al. | 370/252 |
| 2009/0316659 A1* | 12/2009 | Lindoff et al. | 370/332 |

FOREIGN PATENT DOCUMENTS

| | | |
|---|---|---|
| EP | 1770889 A2 | 4/2007 |
| JP | 2007-043696 A | 2/2007 |
| JP | 2007-235446 A | 2/2007 |
| JP | 2008-536387 A | 9/2008 |
| WO | 2007-132329 A2 | 11/2007 |
| WO | 2009/020983 A1 | 2/2009 |
| WO | 2009/021580 A1 | 2/2009 |
| WO | 2009-028819 A2 | 3/2009 |

OTHER PUBLICATIONS

International Search Report for PCT/EP2009/009226 dated Jan. 27, 2011.

Chinese Office Action for Application No. 200980158100.4 dated Aug. 20, 2013.

Notice of Reasons for Rejection for Japanese Application No. 2012-500073 dated Nov. 12, 2013.

* cited by examiner

CHANNEL QUALITY FEEDBACK SIGNALING IN COMMUNICATION SYSTEMS

FIELD OF THE INVENTION

The invention relates to a message for reporting a channel quality of a communication system, a corresponding method and apparatuses performing such method. The invention is inter alia applicable to a 3GPP LTE and LTE-A system as standardized by the $3^{rd}$ Generation Partnership Project (3GPP).

TECHNICAL BACKGROUND

Channel Quality Reporting

Channel quality information is used in a multi-user communication system, such as for example 3GPP LTE (Long Term Evolution) to determine the quality of channel resource(s) for one or more users. This information may be used to aid in a multi-user scheduling algorithm to assign channel resources to different users, or to adapt link parameters such as modulation scheme, coding rate or transmit power, so as to exploit the assigned channel resource to its fullest potential.

A channel resource may be defined as a "resource block" as exemplarily illustrated in FIG. 1 where a multi-carrier communication system, e.g. employing OFDM as for example discussed in the LTE work item of 3GPP, is assumed. More generally, it may be assumed that a resource block designates the smallest resource unit on an air interface of a mobile communication that can be assigned by a scheduler. The dimensions of a resource block may be any combination of time (e.g. time slot, sub-frame, frame, etc. for time division multiplex (TDM)), frequency (e.g. subband, carrier frequency, etc. for frequency division multiplex (FDM)), code (e.g. spreading code for code division multiplex (CDM)), antenna (e.g. Multiple Input Multiple Output (MIMO)), etc. depending on the access scheme used in the mobile communication system.

Assuming that the smallest resource unit is a resource block, in the ideal case channel quality information for all resource blocks and all users should be always available. However, due to constrained capacity of the feedback channel this is most likely not feasible or even impossible. Therefore reduction or compression techniques are required so as to reduce the channel quality feedback signalling overhead, e.g. by transmitting channel quality information only for a subset of resource blocks for a given user.

In 3GPP LTE, the smallest unit for which channel quality is reported is called a subband, which consists of multiple frequency-adjacent resource blocks.

Channel Quality Feedback Elements

Commonly, mobile communication systems define special control signalling that is used to convey the channel quality feedback. In 3GPP LTE, there exist three basic elements which may or may not be given as feedback for the channel quality. These channel quality elements are:

MCSI: Modulation and Coding Scheme Indicator, sometimes referred to as Channel Quality Indicator (CQI) in the LTE specification PMI: Precoding Matrix Indicator RI: Rank Indicator The MCSI suggests a modulation and coding scheme that should be employed for transmission, while the PMI points to a pre-coding matrix/vector that is to be employed for multi-antenna transmission (MIMO) using a transmission matrix rank that is given by the RI. Details about the involved reporting and transmission mechanisms are given in the following specifications to which it is referred for further reading (all documents available at http://www.3gpp.org and incorporated herein by reference):

3GPP TS 36.211, "Evolved Universal Terrestrial Radio Access (E-UTRA); Physical channels and modulation", version 8.5.0, particularly sections 6.3.3, 6.3.4, 3GPP TS 36.212, "Evolved Universal Terrestrial Radio Access (E-UTRA); Multiplexing and channel coding", version 8.5.0, particularly sections 5.2.2, 5.2.4, 5.3.3, 3GPP TS 36.213, "Evolved Universal Terrestrial Radio Access (E-UTRA); Physical layer procedures", version 8.5.0, particularly sections 7.1.7, and 7.2.

In 3GPP LTE, not all of the above identified three channel quality elements are reported at any time. The elements being actually reported depends mainly on the configured reporting mode. It should be noted that 3GPP LTE also supports the transmission of two codeword (i.e. two codeword of user data (transport blocks) may be multiplexed to and transmitted in a single sub-frame), so that feedback may be given either for one or two codewords. Some details are provided in the next sections and in Table 1 below. It should be noted that this information is based on 3GPP TS 36.213, section 7.2.1 mentioned above.

TABLE 1

| Transmission Mode | Mode State | Mode 1-2 | Mode 2-0 | Mode 3-0 | Mode 2-2 | Mode 3-1 |
|---|---|---|---|---|---|---|
| Single-antenna port 0 | NA | NA | 24 | 30 | NA | NA |
| Transmit diversity | 2TX or 4TX antennas | NA | 24 | 30 | NA | NA |
| Closed-loop spatial multiplexing | 2TX antennas RI = 1 | 30 | NA | NA | 28 | 32 |
| | 2TX antennas RI > 1 | 21 | | | 32 | 61 |
| | 4TX antennas RI = 1 | 56 | | | 32 | 34 |
| | 4TX antennas RI > 1 | 60 | | | 38 | 64 |
| Open-loop spatial multiplexing | 2TX antennas | NA | 24 | 30 | NA | NA |
| | 4TX antennas | | 24 | 30 | | |
| Multi-user MIMO | 2TX antennas | NA | NA | NA | NA | 32 |
| | 4TX antennas | | | | | 34 |
| Closed-loop rank-1 precoding | 2TX antennas | 30 | NA | NA | 28 | 32 |
| | 4TX antennas | 56 | | | 32 | 34 |

The individual reporting modes for the channel quality feedback is currently defined in 3GPP LTE as follows:

Reporting Mode 1-2

Contents of this report:

One wideband MCSI value per codeword

One preferred PMI for each subband

In case of transmission modes other than transmission mode 4: One RI value

Reporting Mode 2-0

Contents of this report:

One wideband MCSI value

Positions of M selected subbands

One MCSI value for M selected subbands (2 bits differential to wideband MCSI value, non-negative)

In case of transmission modes other than transmission mode 3: One RI value

Reporting Mode 2-2
  Contents of this report:
    One wideband MCSI value per codeword
    One preferred PMI for wideband
    Positions of M selected subbands
    One MCSI value for M selected subbands per codeword (2 bits differential to wideband MCSI value, non-negative)
    One preferred PMI for M selected subbands
    In case of transmission modes other than transmission mode 4: One RI value
  For transmission mode 4 the reported PMI and MCSI values are calculated conditioned on the reported RI. For other transmission modes they are reported conditioned on rank 1.
Reporting Mode 3-0
  Contents of this report:
    One wideband MCSI value
    One MCSI value per subband (2 bits differential to wideband MCSI value)
    In case of transmission modes other than transmission mode 3: One RI value
Reporting Mode 3-1
  Contents of this report:
    One wideband MCSI value per codeword
    One preferred PMI for wideband
    One MCSI value per codeword per subband (2 bits differential to wideband MCSI value)
    In case of transmission modes other than transmission mode 4: One RI value It should be noted that the term subband is here used so as to represent a number of resource blocks as outlined earlier, while the term wideband represents the whole set of resource blocks in a set of subbands as generally pre-defined by signalling. In the context of 3GPP LTE and LTE-A, the wideband always represents the whole cell bandwidth, i.e. a frequency range of up to 20 MHz.

In the 3GPP LTE downlink, OFDM is employed. Data may be transmitted utilizing a frequency bandwidth of up to 20 MHz in a single cell. For the enhancements presently planned for 3GPP LTE (also referred to as LTE-A, where A stands for "advanced") also OFDM is used in the downlink further using so-called "LTE carrier aggregation" to support frequency bandwidths of up to 100 MHz in a single cell. Each such 3GPP LTE carrier is then commonly referred to as a component carrier (CoCa). A frequency bandwidth up to 100 MHz will be most likely achieved by using five 3GPP LTE carriers (component carriers) in parallel, each of a bandwidth of 20 MHz.

In 3GPP LTE, a simple mechanism is foreseen to trigger the so-called aperiodic channel quality feedback from a user equipment. A Node B in the radio access network send a L1/L2 control signal to the user equipment to request the transmission of the so-called aperiodic CQI report (see 3GPP TS 36.212, section 5.3.3.1.1 and 3GPP TS 36.213, section 7.2.1 for details). Another possibility to trigger the provision of aperiodic channel quality feedback by the user equipments is linked to the random access procedure (see 3GPP TS 36.213, section 6.2). Furthermore, a trigger may also be implemented by an activation or configuration of a periodic CQI report (see 3GPP TS 36.213, section 7.2.2).

Whenever a trigger for providing channel quality feedback is received by the user equipment, the user equipment subsequently transmits the channel quality feedback to the Node B. Commonly, the channel quality feedback (i.e. the CQI report) is multiplexed with uplink (user) data on the Physical Uplink Shared CHannel (PUSCH) resources that have been assigned to the user equipment by L1/L2 signalling by the scheduler (Node B).

Since the channel quality feedback is multiplexed with data on the PUSCH, care must be taken that the user equipment and the Node B have the same understanding about which part of an uplink transmission on the PUSCH within a sub-frame is the channel quality feedback and which part is the user data. In 3GPP LTE, this is usually not an issue because the Node B configures the reporting mode and sets the aperiodic CQI trigger, so it knows when the UE transmits the feedback and also knows the size of the channel quality feedback and—by specification—the location of the feedback and data part within the sub-frame so that the individual parts may be recovered.

In case of a multi-cell operation (e.g. during soft-handover), a user equipment may actually receive the L1/L2 control channel(s) from multiple Node Bs. Generally each of these Node Bs may ask for channel quality feedback individually, without knowledge about other Node Bs feedback requests. This alone may cause different understandings between user equipment and one or more Node Bs on the contents of an uplink transmission. For example, in case the user equipment is communicating the same data to two Node Bs on the uplink, and assuming that one of the Node Bs requests a channel quality report from the user equipment, the other Node B may not be aware of the user equipment multiplexing channel quality feedback and user data in a sub-frame and erroneously assumes that the sub-frame contains user data.

In addition, Discontinuous Reception (DRX) and miss of trigger events can further complicate the situation (see below).

Also for the future enhancement foreseen in 3GPP LTE-A, there are numerous issues why a common understanding of the content of a sub-frame may be disturbed, which leads to inefficient or erroneous transmission of the channel quality feedback and the data part. The general problem is that there could be a diverging understanding for how many of the component carriers the channel quality feedback is requested/transmitted. This circumstance is illustrated in FIG. 2, where transmitter and receiver may have a different understanding of the border between CQI part and Data part of a transmission. This in turn may lead to corruption of the whole CQI and/or data transmission, because data bits may be interpreted as if they were CQI bits, thus corrupting the CQI message. On the other hand, situation may occur where CQI bits are assumed to be data bits, thus corrupting the data transmission. The least possible impact would be that FEC redundancy for CQI and/or data is missing, which reduces the error resilience of the involved FEC.

Furthermore, another situation that may lead to a diverging understanding of the content of a transmission in 3GPP LTE is resulting from the user equipments being able to go into a DRX mode when it is not receiving any control signal for a defined number of sub-frames. Since the Node B may send a control signal, but due to erroneous reception (e.g. as a result of noise on the channel, etc.) the user equipment is not aware of the control signal, so that it may enter DRX mode even though the Node B believes the user equipment to still be in an active mode.

For 3GPP LTE-A where LTE carrier aggregation will be most likely used, it is possible that the user equipment goes into DRX mode per LTE carrier (component carrier). In other words, the UE can be in DRX mode for some component carriers available for communication, while it is still active for other component carriers. This situation is exemplarily illustrated in FIG. 3. Since the user equipment is not receiving or processing any signals from component carriers for which the user equipment is in DRX mode, it can be assumed that no CQI can be measured and reported for such component carriers.

The problem for CQI reporting is that the user equipment can only report channel quality elements for component carriers for which it is not in DRX mode. Therefore if the understanding on DRX mode for the component carriers is different between user equipment and Node B, user equipment and Node B will have different understandings on the content of the channel quality feedback. This is exemplarily highlighted in FIG. 4.

Furthermore, it may be also assumed that in 3GPP LTE-A CQI reports may also be triggered in a similar fashion as in 3GPP LTE. Even though the exact triggering mechanism for 3GPP LTE-A is not clear yet, it is possible that aperiodic CQI reporting is called for a given component carrier only, if the aperiodic CQI trigger bit in the L1/L2 control channel within the same component carrier is activated. This is illustrated in FIG. 5. Consequently, due to noise etc. it can occur that the Node B actually transmits CQI feedback triggers for three component carriers, but the user equipment is aware of only two of them. Accordingly, the user equipment would send a CQI report for only two component carriers, but the Node B assumes that the CQI report contains channel quality feedback for three component carriers. This scenario is exemplarily illustrated in FIG. 6.

Another situation, where a (detailed) reporting on the channel quality of a component carrier may be not desirable in view of transmission efficiency, is a situation where the channel conditions of the component carrier indicate a very low signal-to-noise ratio. In case the channel condition is actually very bad for a user equipment, it may not be required or reasonable to transmit a large feedback report to the Node B, since the channel quality feedback is mainly designed to be used to determine the resources and transmission parameters for data to a user equipment. If channel quality does not allow for data to be transmitted on the component carrier, the Node B will not schedule (allocate) any resources to the user equipment but instead wait (in time) until the channel conditions improve or the Node B assigns the user equipment to other frequency ranges or even component carriers where the channel quality is superior. Therefore, it would be a waste of uplink resources to transmit a large feedback report which effectively only causes the network not to allocate resources on such component carrier. Particularly the transmission of subband MCSI or PMI costs a lot of bits. Regarding the data in Table 1 above, the sizes are valid for a single component carrier of 20 MHz bandwidth. Consequently, reporting detailed CQI for five such component carrier costs five times the number of bits as given in Table 1. Clearly this is not efficient in case that some component carriers have very low CQI.

SUMMARY OF THE INVENTION

One object of the invention is to suggest a reporting mechanism for reporting the channel quality of at least one component carrier that mitigates one or more of the above outlined problem.

The object is solved by the subject matter of the independent claims. Advantageous embodiments of the invention are subject matters of the dependent claims.

One aspect of the invention is to suggest a structure for transmissions (referred to as a message in the following) that allows conveying channel quality information in a manner allowing an unambiguous identification of the size (in terms of the number of bits of) channel quality information of the structure. This is achieved by defining a message (which may also be referred to as a sub-frame or time slot format) comprising a first channel quality field consisting of a known number of bits, and a second channel quality field consisting of a variable number of bits. The number of bits and structure (of the content of the bits) of the second channel quality field is indicated by the content of the bits of the first channel quality field. The configuration of the second channel quality field can also be referred to an "arbitrary but known" expressing that the field size is variable, but still determinable from some supplementary information, i.e. the content of the first channel quality field comprised in the transmission structure.

The number of bits of the first channel quality field may be system specific, e.g. depending on the number of component carriers that is available for the communication between a mobile terminal (referred to as user equipment in the 3GPP terminology) and a base station (referred to as Node B in the 3GPP terminology). Accordingly, the number of bits is considered known and unambiguous.

Furthermore, it should be noted that the invention is generally applicable to systems, like 3GPP LTE, where a single component carrier is available for communication, but may be likewise employed in systems, like 3GPP LTE-A, where plural component carriers are provided for communication.

In a more specific embodiment of the invention, the first channel quality field of the message indicates a first quality measure for each of a plurality of component carriers. Moreover, the first channel quality field indicates for each of the component carriers whether or not the second channel quality field of the message comprises a further second channel quality measure pertaining to the respective component carrier. A channel quality measure may be a single measurement value indicating a channel quality or may consist of one or more channel quality indicator elements, such as for example MCSI, PMI or RI. In case of channel quality reporting for multiple codewords or transport blocks, there can actually exist such elements for each such codeword, e.g. there can be one or more MCSI for each codeword contained in the channel quality measure (cf. the description of LTE reporting mode 3-1).

In a variation of this embodiment, the first channel quality field further indicates whether or not the second channel quality field comprises further control information related to the respective component carrier. Accordingly, in this variation, the channel quality is reported in the first channel quality field, while the second channel quality field may provide to the receiver of the message further control information related to one or more component carriers that could be for example relevant for scheduling.

In a further embodiment of the invention the number of bits of the first channel quality field depends on the number of component carriers available for communication between a base station and a communication terminal. Hence, there may be for example a given number of bits (1 bit or more) per component carrier foreseen in the first channel quality measure.

In another exemplary embodiment the first channel quality field consists of a number of sub-fields. Each of these sub-fields is associated to a respective component carrier, so that the number of sub-fields present in the first channel quality field of the message is defined by the number of component carriers available for communication between a base station and a communication terminal. The component carriers available for communication may be predefined by the system or may be configured by control signalling.

The size (in terms of bits) of the respective sub-fields (in terms of bits) of the first channel quality field may be fixed or may for example depend on a reporting mode out of a plurality of channel quality reporting modes used for a respective component carrier. Generally, each component carriers may be assigned a respective reporting mode, or alternatively all component carriers may have a common reporting mode. This common reporting mode may be for example configurable by control signalling.

In a further exemplary variation of the embodiment, the second channel quality field is divided into a number of sub-fields. The size of each sub-field of the second channel quality field may for example depend on a reporting mode out of the plurality channel quality reporting modes used for the component carrier associated to the respective sub-field of the second channel quality field.

In one example, the size of the sub-fields of the channel quality field is one bit, i.e. the first channel quality field of the message consists of a number of flags for the component carriers. Each flag is associated to a respective component carrier of a plurality of component carriers available for communication between a base station and a terminal. Each flag of the first channel quality field indicates whether or not a channel quality measure for a respective component carrier is present in the second channel quality field.

In another example, the first channel quality field contains a plurality of channel quality measures. Each of these quality measures provides a channel quality measure of a respective component carrier of a plurality of component carriers available for communication between a base station and a terminal. Furthermore, each channel quality measure of the first channel quality field indicates whether or not a further second channel quality measure for a respective component carrier is present in the second channel quality field.

In a further embodiment of the invention, a channel quality measure of a respective component carrier comprised in the first channel quality field could for example consist of a wideband modulation and coding scheme indicator (WB MCSI) and/or a wideband rank indicator (WB RI). For example, if the wideband modulation and coding scheme indicator or the wideband rank indicator for the component carrier indicates "out of range" (or "undefined") no further channel quality measure of a component carrier is comprised in the second channel quality field.

Another aspect of the invention is related to procedure for signalling the message reporting channel quality information. According to a further embodiment of the invention a method for transmitting channel quality information is provided that comprises receiving control signalling allocating a resource on an air interface. Furthermore the method foresees that a message for conveying channel quality information according to one of the various embodiments of the invention described herein is generated and transmitted on the allocated resource.

In a further embodiment of the invention, a plurality of component carriers are available for communication between a base station and a terminal, and according to the method control signalling configuring the reporting mode out of the plurality of channel quality reporting modes for each of the component carriers is received. As indicated above, the reporting mode may be the same for all carriers or different component carriers may use different reporting modes. The reporting mode of the respective component carriers is considered in the generation of the message for conveying channel quality information.

For example, the sub-field size for a respective component carrier in the first and/or second channel quality field of the message may depend on the reporting mode configured for the component carrier. As both the mobile terminal and the base station are aware of the available component carriers for communication and the reporting models) for the component carriers, the size and structure of the first and second channel quality field can be unambiguously identified by the entity receiving the message.

In another embodiment of the invention, the method further comprises measuring a channel quality of at least a subset of a plurality of component carriers available for communication between a base station and a terminal, thereby obtaining channel quality measures for the component carriers. Furthermore, it is decided for a respective component carrier for which the channel quality has been measured, whether to include a further channel quality measure for the respective component carrier in the second channel quality field of the message based on the channel quality measurement result. This decision obviously influences the content that is added to the message for conveying the channel quality information during its generation.

In one example, measuring the channel quality for a respective component carrier comprises performing a wideband measurement on the entire bandwidth of the component carrier. In this example, the decision whether to include a channel quality measure to the second channel quality field of the message for the respective component carrier is based on the result of the wideband measurement. If the wideband measurement indicates a channel quality for the component carrier below a certain threshold level, it may be for example decided by the entity performing the measurement not to report any measurement result or only basic measurement results (e.g. only the wideband measurement itself).

In another variation of the embodiment, measuring the channel quality for a respective component carrier comprises determining a wideband modulation and coding scheme indicator and/or a wideband rank indicator for a respective component carrier that can be included to the message.

In another embodiment, the entire available resource as allocated by the corresponding control signalling is used for the signalling of channel quality information. The control signalling allocating the resource on an air interface may for example indicate the total number of coded bits T for the message. The coding rate for encoding the bits of the first and the second channel quality field may be adapted such that the equation $$T=CQ_1+CQ_2$$

is satisfied, wherein $CQ_1$ is the number of coded bits of the first channel quality field and $CQ_2$ is the number of coded bits of the second channel quality field.

In an alternative embodiment, the excess (coded) bits remaining in the message not utilized for channel quality information signalling may be used to convey additional control signalling and/or user data. Accordingly, in this exemplary embodiment coded control information bits and/or coded user data bits are added to the message such that the equation $$T=R+CQ_1+CQ_2$$

is satisfied, wherein R is the number of coded control information bits and/or coded user data bits, $CQ_1$ is the number of coded bits of the first channel quality field and $CQ_2$ is the number of coded bits of the second channel quality field.

In a further embodiment of the invention, the control signalling allocating the resource on an air interface further indicates a modulation scheme, and the coded bits of the message are modulated according to the modulation scheme.

In one exemplary embodiment of the invention, a communication terminal performs the above outlined method. A communication terminal may be a mobile terminal or a relay in a mobile communication system. In this exemplary embodiment, the communication terminal is in a discontinued reception mode for one of a plurality of component carriers available for communication with a base station. The communication terminal indicates in the first channel quality field of the message that no further channel quality information for the component carrier for which the terminal is in discontinued reception mode is transmitted in the second channel quality field of the message.

Another aspect of the invention is the implementation and use of the concepts outlined herein in network entities of the mobile communication system. Another embodiment of the invention therefore provides a communication terminal for transmitting a message via an air interface of a communication system to a base station. The communication terminal comprises a receiver for receiving control signalling allocating a resource on an air interface, and a processing unit for generating the message for conveying channel quality information according to one of the different embodiments described herein. For transmission of the generated message, the communication terminal comprises a transmitter that transmits the message on the allocated resource to the base station.

In one example, the communication terminal is a mobile terminal (user equipment in the 3GPP terminology). In an alternative example, the communication terminal is a relay within the mobile communication system that is connected to the base station via an air interface and relays data from this base station to mobile terminals via another air interface.

The communication terminal according to another embodiment of the invention is comprising all necessary means for performing the steps of the method for transmitting channel quality information according to one of the various embodiments described herein.

While in the exemplary embodiments above related to a communication terminal, channel quality feedback in the uplink has been considered (i.e. the channel quality information is sent to the base station), another embodiment of the invention relates to the signalling of channel quality information on the downlink by a base station (or relay). Accordingly, this embodiment provides a base station (or relay) for transmitting a message conveying channel quality feedback information via an air interface of a communication system to a communication terminal. The base station (or relay) comprises a transmitter for transmitting control signalling allocating a resource on an air interface, and a processing unit for generating the message conveying channel quality feedback information according to one of the various exemplary embodiments described herein. Furthermore, the base station (or relay) comprises a transmitter for transmitting the message on the allocated resource to the communication terminal. A skilled person in the art understands that the concept of the invention can be generalised to a message and method for CQI transmission from any CQI transmission entity to a CQI reception entity.

The base station according to a further embodiment of the invention comprises means adapted to perform the steps of the method for transmitting channel quality information according to one of the various embodiments described herein.

Another aspect of this invention is its implementation and use of software and computer-readable media. According to this further aspect, another embodiment of the invention relates to a computer-readable medium storing instructions that, when executed by a processor of a communication terminal (such as a mobile terminal or relay), cause the communication terminal to transmit a message via an air interface of a communication system to a base station, by receiving control signalling allocating an resource on an air interface, generating the message conveying channel quality feedback information according to one of the various exemplary embodiments described herein, and transmitting the message on the allocated resource to the base station.

According to another embodiment of the invention, a computer-readable medium is provided that is storing instructions that, when executed by a processor of a base station, cause the base station (or a relay) to transmit a message via an air interface of a communication system to a communication terminal, by transmitting control signalling allocating a resource on an air interface, generating the message conveying channel quality feedback information according to one of the various exemplary embodiments described herein, and transmitting the message on the allocated resource to the communication terminal.

The computer-readable media may further store instruction that, when executed by the processor of the base station, cause the base station to perform the steps of the method for transmitting channel quality information according to one of the various embodiments described herein.

BRIEF DESCRIPTION OF THE FIGURES

In the following, the invention is described in more detail in reference to the attached figures and drawings. Similar or corresponding details in the figures are marked with the same reference numerals.

DETAILED DESCRIPTION OF THE INVENTION

Figure 1:
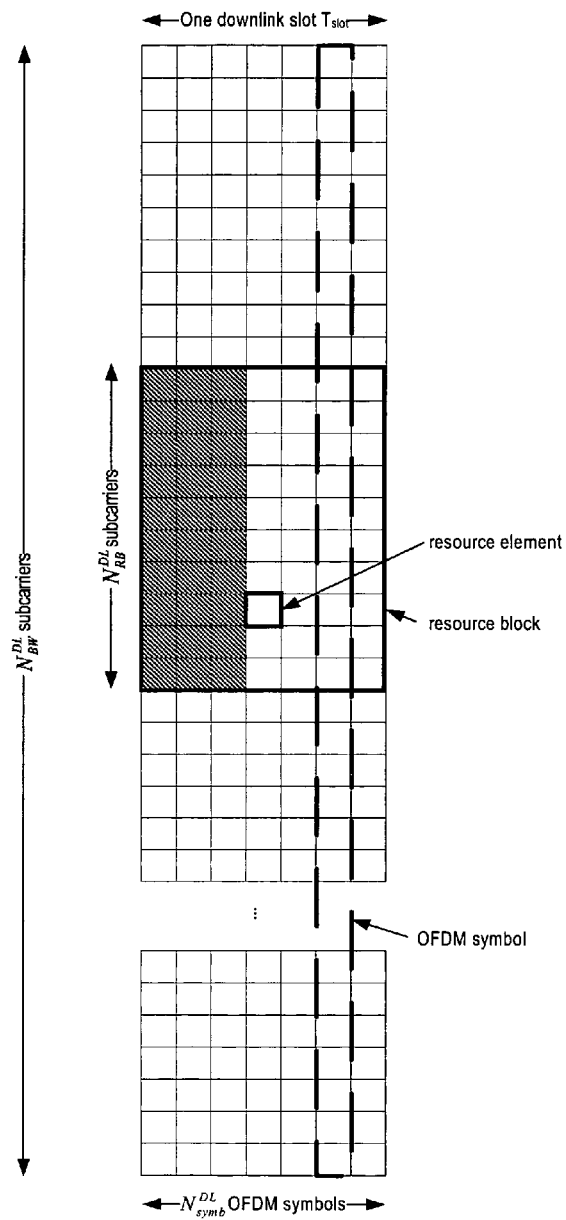
FIG. 1 shows an exemplary resource grid of a slot of an OFDM channel structure according to 3GPP LTE.
Figure 2:
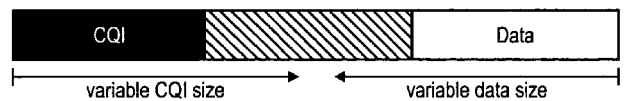
FIG. 2 shows the variable border between CQI part and data part of an uplink transmission.
Figure 3:
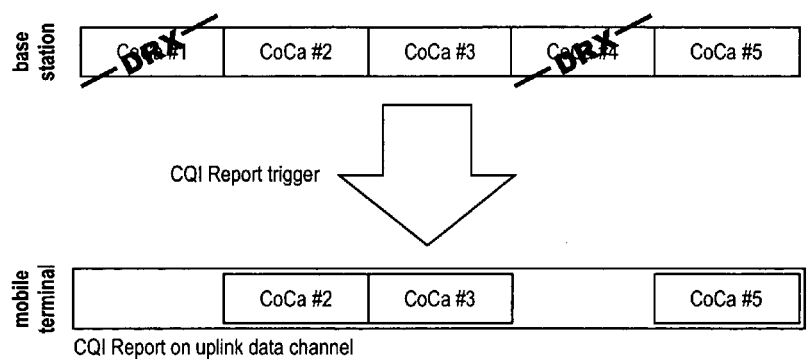
FIG. 3 shows a component carrier-wise DRX mode and its effect on the CQI report content.
Figure 4:
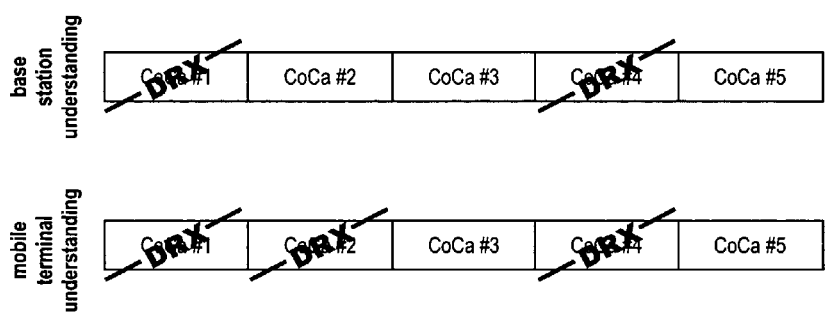
FIG. 4 shows a base station's and a mobile terminal's understanding of DRX mode component carriers to exemplify the potential CQI feedback problems occurring therefrom.
Figure 5:
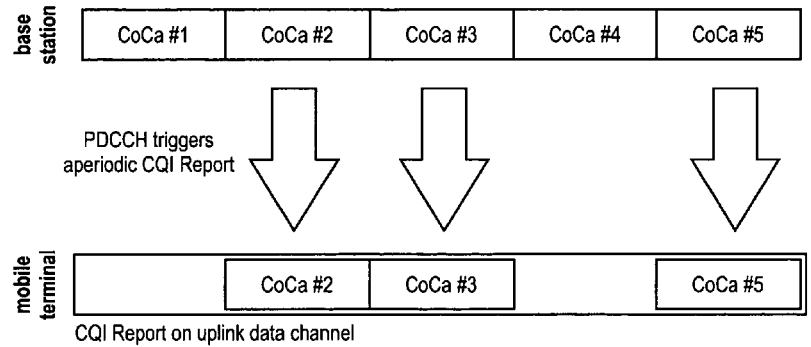
FIG. 5 shows a component carrier-wise CQI feedback triggering and the corresponding CQI report content.
Figure 6:
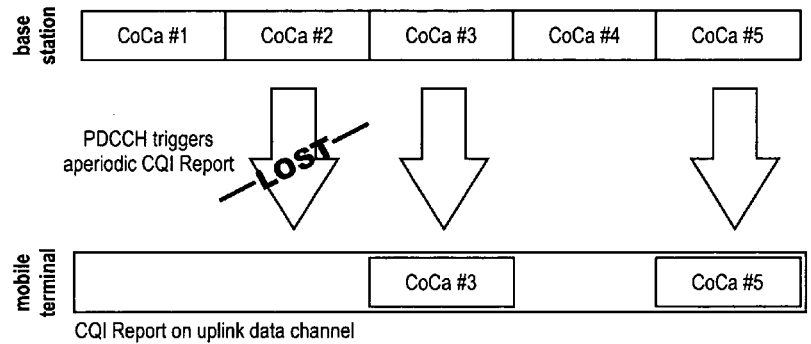
FIG. 6 shows a component carrier-wise CQI feedback triggering, wherein the mobile terminal is not receiving one of the triggers, and the corresponding CQI report content.

The following paragraphs will describe various embodiments of the invention. For exemplary purposes only, most of the embodiments are outlined in relation to an (evolved) communication system according to LTE and its currently developed enhancements discussed in the Technical Background section above.

As already indicated in the Summary of Invention section above, one aspect of the invention is to suggest a structure for transmissions (referred to as a message in the following) that allows conveying channel quality information in a manner allowing an unambiguous identification of the size channel quality information of a message conveying same. This is achieved by defining a message that is—depending on the implementation, inter alia—suitable to convey channel quality information. The message comprises a first channel quality field and a second channel quality field. The first channel quality field is used to indicate the content (and organization) of the second channel quality field.

The size (in terms of number of bits) of the first channel quality field is known so that the receiver of the message is always certain on the contents thereof. The second channel quality field consists of a variable number of bits. The number of bits and the content of the bits of the second channel quality field are indicated by the content of the bits of the first channel quality field. This configuration of the second channel quality field can also be referred to an "arbitrary but fixed" expressing that the field size is variable and depends on the information to be included to the field, but the field size is unambiguously determinable from some supplementary information, i.e. the content of the first channel quality field.

The number of bits of the first channel quality field is known. This could for example mean that the number of bits of the first channel quality field is static in that it is not subject to change but e.g. set by system definition. In a more flexible implementation the number of bits of the first channel quality field in the message is known to sender and receiver thereof, but is semi-static. This means that the size of the first channel quality field may be changed, e.g. by means of control signalling. In one example, the size of the first channel quality field is depending on the number of component carriers that is available for the communication between a mobile terminal (referred to as user equipment in the 3GPP terminology) and a base station (referred to as Node B in the 3GPP terminology). In another example, the size of the first channel quality field is (additionally) depending on the reporting mode for the channel quality information, as will be outlined below in further detail. In both examples, the exact number of bits of the first channel quality field is known and unambiguous.

A component carrier may be understood to be equivalent to an LTE carrier of a 3GPP LTE system. According to the studies for LTE-A, the Layer 1 specification shall support carrier aggregation for both contiguous and non-contiguous component carriers with each component carrier limited to a maximum of 110 Resource Blocks using the 3GPP Release 8 (i.e. 3GPP LTE) numerology. Therefore it can be concluded that the maximum bandwidth per component carrier should be smaller than 22 MHz. For the purpose of the following description, the component carrier is designating an aggregation of up to 110 Resource Blocks. Furthermore, it is assumed that the channel quality reporting mode is in principle configured per component carrier, but that it is also possible to configure the same reporting mode for all component carriers available for communication.

In the following exemplary embodiments of the invention, reference is made to a 3GPP LTE-A system, whereby it is assumed for exemplary purposes that there are plural (e.g. five) component carriers available for communication, or a 3GPP LTE system. Furthermore, for exemplary purposes only, a scenario of reporting the channel quality (so-called CQI reporting) on the downlink by means of respective uplink messages conveying the channel quality information is discussed.

As outlined above, according to one aspect of the invention, the user equipment gives the Node B(s) an indication for which component carriers' (or carrier's) channel quality information is reported in the channel quality feedback and for which not. Fundamentally this is achieved by splitting the report into two different parts (also denoted "fields" herein).

Figure 7:
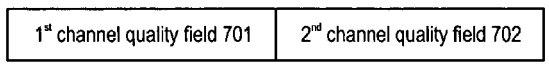
FIG. 7 & FIG. 8 show exemplary messages for reporting channel quality feedback (e.g. CQI reports) according to different embodiments of the invention.

FIG. 7 shows an exemplary conceptual split of an uplink transmission (message) into a first channel quality field 701 (carrying an indication—and optionally basic channel quality information—per component carrier) and a second channel quality field 702 (carrying the detailed channel quality information per component carrier). In another exemplary embodiment of the invention as shown in FIG. 8, the uplink transmission (message) further comprises an additional field 703 for conveying data and/or control information.

Figure 8:
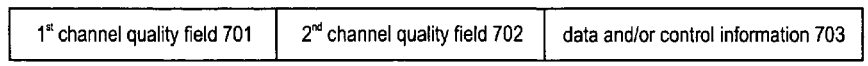

FIGS. 7 and 8 show that the uplink message for signaling aperiodic channel quality information can be divided logically into two, respectively three distinct parts:
First channel quality field 701
Second channel quality field 702
Data and/or control information 703 (optional)

According to one embodiment of the invention, the overall size of the uplink message is defined by the uplink resource assignment. Such a scheduling message for assigning the resource and thereby defining the size of the message may be for example received by a user equipment through a L1/L2 control channel. This L1/L2 control channel is also known as the Physical Downlink Control Channel (PDCCH) in the 3GPP terminology.

The first channel quality information field has a fixed size that may however depend e.g. on a higher-layer configuration (by means of control signaling) on which and how many component carriers the downlink traffic between Node B and user equipment can operate in principle. Therefore the size and content of first channel quality information field should be known to the feedback receiver (which is usually the Node B if considering a scenario for downlink data transmission and channel quality feedback on the uplink), so that it can be detected and decoded directly after reception of the feedback message. The first channel quality field contains the basic indication whether any channel quality information for a component carrier is included in the second channel quality field or not. Consequently, the indicator for a component carrier in the first channel quality field should only be set if further channel quality information for that component carrier is included in the second channel quality field.

If channel quality information for a component carrier is included in the second channel quality field, the channel quality information will depend on the configured channel quality information reporting mode for that component carrier. The configured channel quality information reporting mode can be assumed to be known to both transmission ends by means of higher layer control signaling and configuration before a channel quality information report is transmitted. In principle, the reporting mode can be configured individually for each component carrier, but it can also be a single reporting mode valid for all component carriers, where however the channel quality reporting is still done for each component carrier individually. As an alternative, the reporting mode can be part of the aperiodic channel quality information request.

In the following four different exemplary designs of a message for conveying channel quality information according to different embodiments of the invention are described in further detail. Table 2 below provides an overview of these embodiments of the invention that will be discussed below with respect to FIG. 9 to FIG. 12.

TABLE 2

Figure 9:
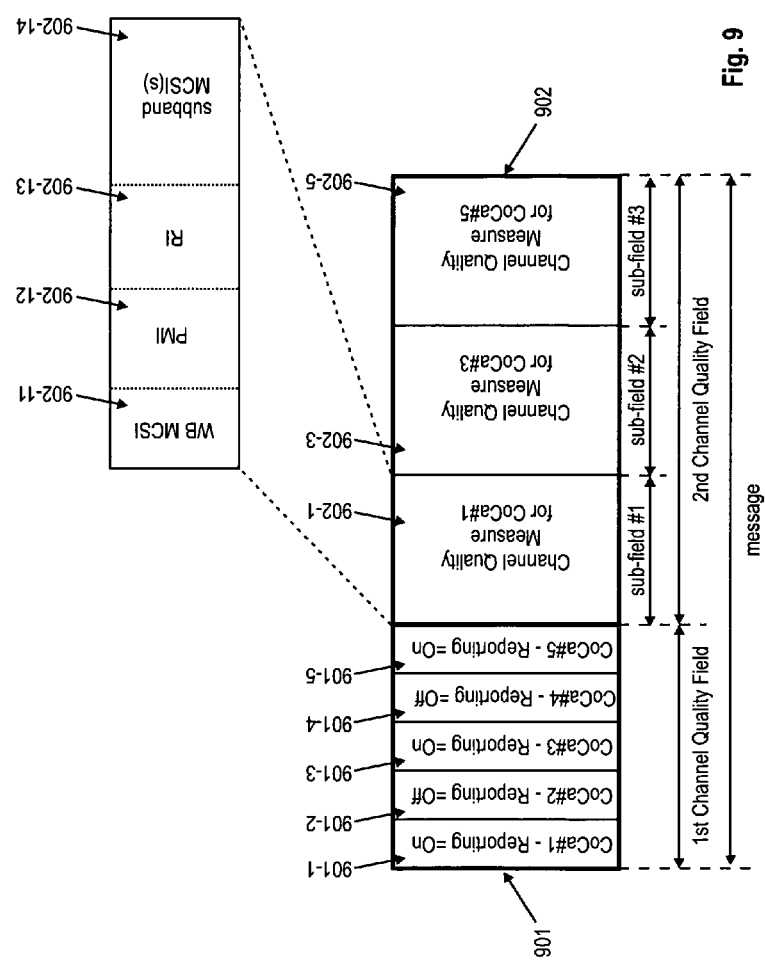
FIG. 9 to FIG. 12 show the structure and contents of a message reporting channel quality feedback according to different embodiments of the invention.
Figure 10:
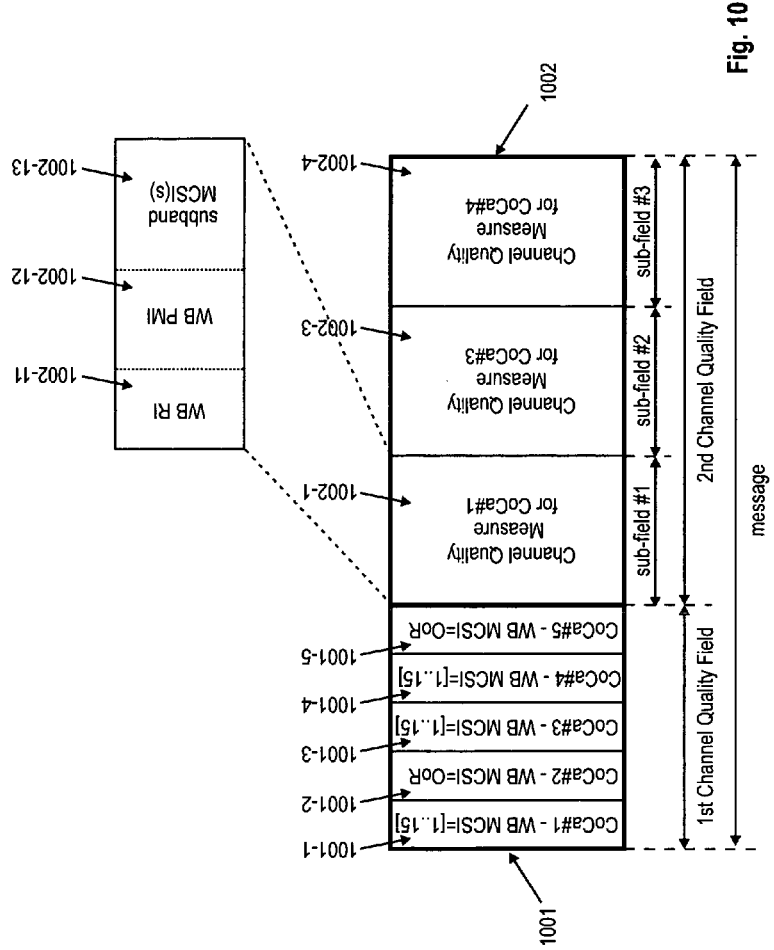
Figure 11:
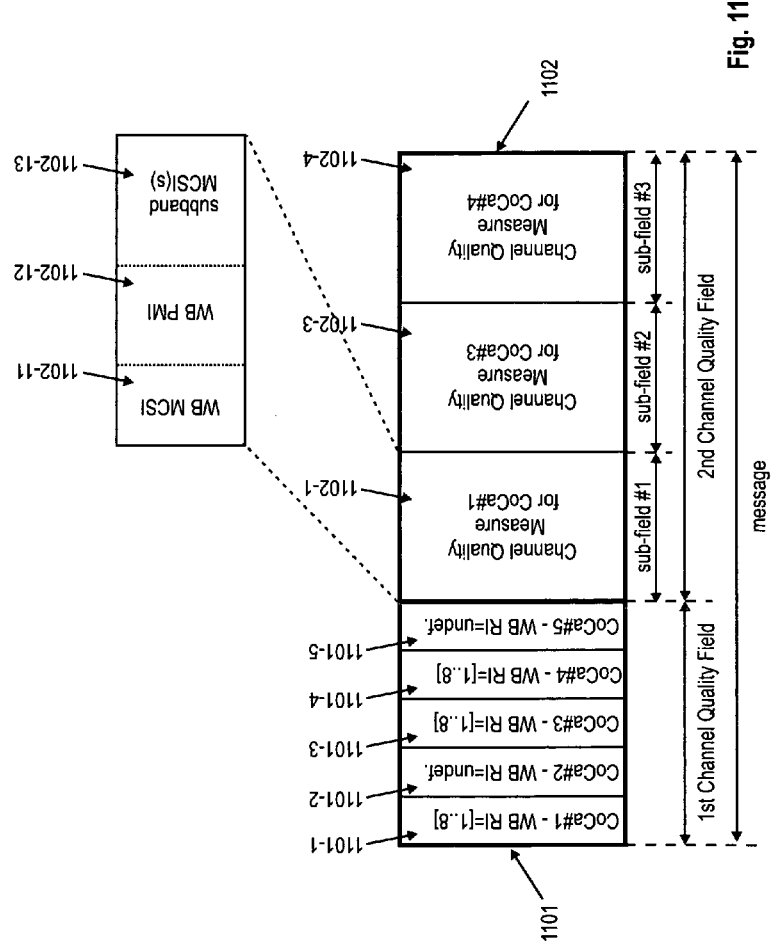
Figure 12:
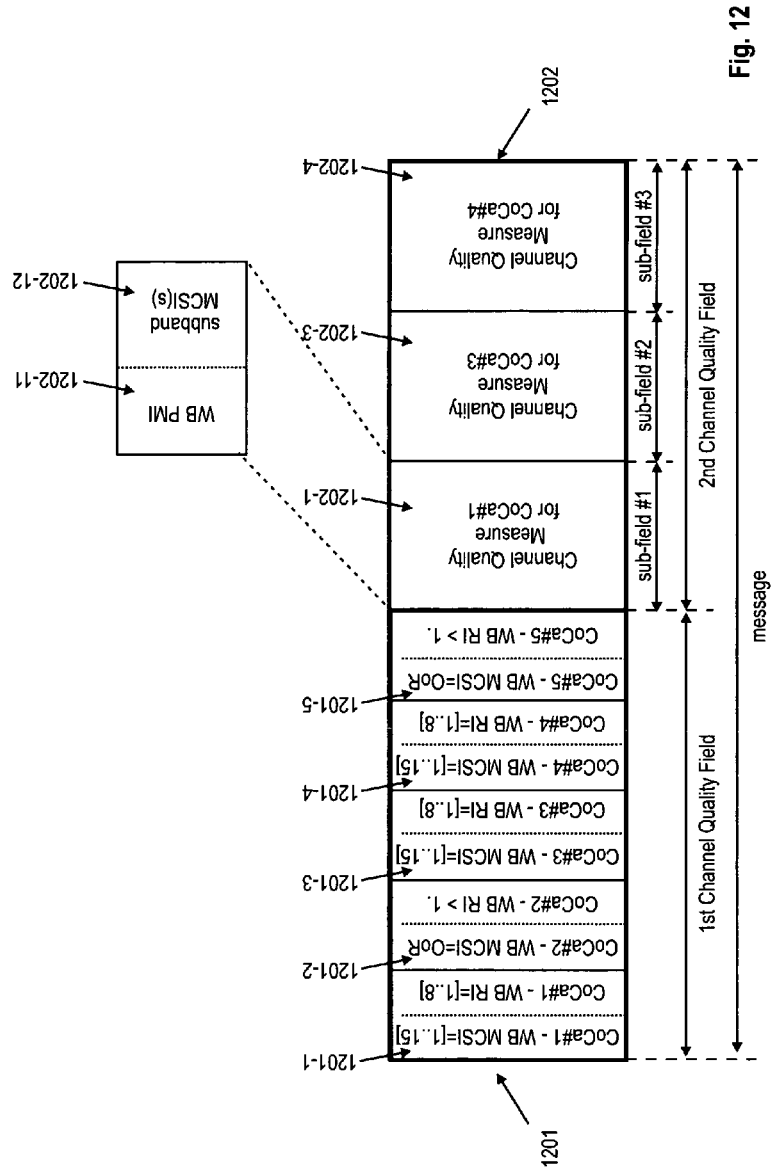

|  | Embodiment of FIG. 9 | Embodiment of FIG. 10 | Embodiment of FIG. 11 | Embodiment of FIG. 12 |
|---|---|---|---|---|
| Content of 1st channel quality field (per component carrier) | Indicator Bit (Flag) | WB MCSI | WB RI | WB MCSI, WB RI |
| Content of 2nd channel quality field (per component carrier) | WB MCSI, PMI, RI, subband MCSI(s) | PMI, RI, subband MCSI(s) | MCSI, PMI | PMI, subband MCSI(s) |
| Indication for no CQI for component carrier in 2nd channel quality field | Indicator Bit = "On" | WB MCSI = "OoR" | WB RI = "undefined" | WB RI > 1 & WB MCSI = "OoR" |

In one exemplary implementation according to one embodiment of the invention, the first part carries the indication, and the second part carries the channel quality feedback information. In this example the indication can be as simple as a one-bit information (flag) per component carrier which is indicating whether channel quality information for a given component carrier is present in the second part of the channel quality report or not, depending on its value.

An exemplary implementation of the message format for conveying the channel quality information according to an embodiment of the invention is shown in FIG. 9. The message consists of a first channel quality field 901 and a second channel quality field 902. The first channel quality field 901 consists of one flag for each component carrier that is available to the communication of data on the downlink. Accordingly, the receiver of the message (the Node B in this example) knows the number of bits of the first channel quality field. If there are five component carriers available, the first channel first channel quality field has five flags 901-1, 901-2, 901-3, 901-4, 901-5, respectively bits. Each flag indicates whether or not channel quality information for the respective component carrier is provided in the second channel quality field. In the example shown in FIG. 1, it is assumed that the flags 901-1, 901-3, and 901-5 indicate the presence of respective channel quality measures (also denoted sub-fields) 902-1, 902-3, and 902-5 in the second channel quality field 902.

Generally, the channel quality information for a component carrier can be assumed to be reported as a channel quality measure (902-1, 902-3, 902-5). Each of these measures may report one or more measurement results, or indications of a channel quality. For example, the respective sub-field associated to each component carrier in the second channel quality field (if channel quality information is reported for the given component carrier) may convey one or more measurement results or indications of the channel quality, such as for example the channel quality elements (wideband/subband) MCSI, PMI, RI discussed previously herein.

In the example of FIG. 9, it may be assumed that the reporting mode is set to reporting mode 3-1 as shown in Table 1 above for each component carrier, so that for each component carrier of which channel quality information is reported in the message, the respective sub-fields 902-1, 902-3, 902-5 carrying the channel quality measure are each reporting the elements WB MCSI 902-11, WB PMI 902-12, WB RI 902-13 and subband MCSI(s) 902-14 for each subband of the component carrier.

In another alternative embodiment of the invention the indication of whether further channel quality information for a component carrier follows in the second channel quality field is implicitly tied to a channel quality measure for the respective component carrier included in the first channel quality field.

Optionally in this exemplary embodiment of the invention, the user equipment can decide that the channel quality in a component carrier is not sufficiently good (e.g. below a certain threshold) that it is reasonable to transmit detailed channel quality feedback for that component carrier. A corresponding indication is then given in the first channel quality field indicating that no further channel quality information for that component carrier is included in the second channel quality field of the message. For example, situations where the user equipment cannot or does not include detailed information on the channel quality for a component carrier may be that the user equipment is in DRX mode for a component carrier or channel quality measurement on the component carrier indicates a channel quality not worth reporting in further detail, as it is unlikely that resources are assigned to the user equipment on the component carrier in view of the low channel quality.

One exemplary embodiment of the invention where the indication of the content of the second channel quality filed is implicitly tied to the content of the first channel quality field is illustrated in FIG. 10. In this example, the first channel quality field 1001 includes for each available component carrier a sub—the first channel quality field 1001-1, 1001-2, 1001-3, 1001-4, 1001-5 that consists of a channel quality measure of one element, a wideband MCSI (WB MCSI) element of the respective component carrier. The use of a wideband MCSI element as an indicator within a 3GPP LTE or 3GPP LTE-A based communication network is advantageous, as it is present in all reporting modes. As can be further recognized from Table 3 below, the wideband MCSI in 3GPP LTE can represent one out of 16 values.

In case that this WB MCSI should indicate that there is no further channel quality information for a component carrier in second the first channel quality field 1002 of the message, one or more of the values (one MCSI index) may be used for that purpose. Any MCSI index that should yield no further channel quality measure to be present in the second channel quality field 1002 may be for example a MCSI index that does not represent a large spectral efficiency. For example, any MCSI index reported for WB MCSI that represents a spectral efficiency below 2.0 could be chosen for such indication.

TABLE 3

| MCSI index | Modulation Scheme | Code Rate * 1024 | Spectral Efficiency |
|---|---|---|---|
| 0 | | Out of Range (OoR) | |
| 1 | QPSK | 78 | 0.1523 |
| 2 | QPSK | 120 | 0.2344 |
| 3 | QPSK | 193 | 0.3770 |
| 4 | QPSK | 308 | 0.6016 |

TABLE 3-continued

| MCSI index | Modulation Scheme | Code Rate * 1024 | Spectral Efficiency |
|---|---|---|---|
| 5 | QPSK | 449 | 0.8770 |
| 6 | QPSK | 602 | 1.1758 |
| 7 | 16QAM | 378 | 1.4766 |
| 8 | 16QAM | 490 | 1.9141 |
| 9 | 16QAM | 616 | 2.4063 |
| 10 | 64QAM | 466 | 2.7305 |
| 11 | 64QAM | 567 | 3.3223 |
| 12 | 64QAM | 666 | 3.9023 |
| 13 | 64QAM | 772 | 4.5234 |
| 14 | 64QAM | 873 | 5.1152 |
| 15 | 64QAM | 948 | 5.5547 |

Alternatively, MCSI indices that represent a low-order modulation, such as QPSK, i.e. up to index value 6 in the example of Table 3 could be used to indicate that no additional channel quality information is provided in the second channel quality filed 1002 of the message.

According to one further exemplary embodiment of the invention, the MCSI index that represents "Out of Range" (for example MCSI index 0 in Table 3) is used as an indicator for indicating no channel quality information is provided in the second channel quality filed 1002 of the message. As can be seen in the example of Table 3, the MCSI index 0 indicates that the channel quality for the component carrier is inferior such that a transmission even using a low modulation and a low code rate will not be possible to be received correctly with a probability of 10% or less. Typically, if the scheduler would be provided with such channel quality feedback it will neglect the user equipment for such a band (e.g. component carrier or subband) when it schedules and allocates transmission resources to user equipments within its coverage area.

The exemplary message structure shown in FIG. 10 is similar to the message structure shown in FIG. 9, except for the first channel quality the first channel quality field 1001 comprising individual sub-fields 1001-1, 1001-2, 1001-3, 1001-4, 1001-5 conveying a channel quality measure (in this example the WB MCSI of the given component carrier), instead of flags 901-1, 901-2, 901-3, 901-4, 901-5, respectively an individual bit for each component carrier. As the sub-fields 1001-1, 1001-2, 1001-3, 1001-4, 1001-5 already convey the WB MCSI element as a channel quality measure, the respective element does not need to be included in the second channel quality field within the sub-fields 1002-1, 1002-3, 1002-4 providing additional channel quality information for the component carriers.

In the example shown in FIG. 10, it is assumed for exemplary purposes that the first channel quality the first channel quality field 1001 of the message comprises five-fields 1001-1, 1001-2, 1001-3, 1001-4, 1001-5 conveying a respective channel quality measure for each component carrier. In this example, this channel quality measure consists of the WB MCSI element for a given component carrier. The WB MCSI element consists of 4 bits allowing to identify 16 different WB MCSI indices as illustrated in Table 3. In this example, it may be assumed that the WB MCS index 0 indicates "Out of Range", i.e. that the channel quality measured for the respective component carrier is below a given threshold (e.g. the spectral efficiency, SNR, SINR, etc. is lower than a threshold value) and that no sub-field for the respective component carrier is present in the second channel quality the first channel quality field 1002 to report more detailed measurement results for this component carrier. In FIG. 10, detailed channel quality information is only reported for component carriers #1, #3, and #4. Consequently the WB MCSI for component carriers #2 and #5 within the respective subfields 1001-2 and 1001-5 of the first channel quality the first channel quality field 1001 indicates "Out of Range" (OoR), i.e. value 0, while the other sub-fields 1001-1, 1001-3 and 1001-4 channel quality the first channel quality field 1001 indicate values between 1 and 15.

In the second channel quality field 1002, the channel quality information are provided for component carriers #1, #3, and #4. The respective sub-fields 1002-1, 1002-3 and 1002-4 comprise a respective channel quality measure which includes the remaining or further elements according to the configured reporting mode (in this example mode 3-1) for component carriers #1, #3, #4.

The WB MCSI is usually a measurement on the entire bandwidth of a component carrier and this provides an indication of the modulation and coding scheme that could be employed for a transmission that employs the entire bandwidth of the component carrier, or at least comprising a plurality of subbands. Even though the WB MCSI of a component carrier is not feasible for transmission as typically not the entire bandwidth of the component carrier is allocated to a single user equipment, it may well occur that some subbands within the component carrier support a higher MCSI for transmission than that indicated by the WB MCSI. According to 3GPP TS 36.213, section 7.2.1 and tables 7.2.1-2 and 7.2.1-4, the MCSI indices for a subband are representing only the difference between the MCSI value for a subband and the MCSI index signaled for the wideband measurement of the component carrier. Furthermore, according to Table 7.2.1-2 and Table 7.2.1-4 in 3GPP TS 36.213 this difference is limited to a maximum of +2 and +4 MCSI levels respectively, depending on the reporting mode. In other words, when the wideband MCSI is reporting "0", the maximum value that can be reported for a subband is equivalent to subband MCSI level 4. Even this subband MCSI level does not allow a large bit rate transmission, so that the performance loss by not being able to report such value according to the exemplary embodiments of the invention where it is determined based on a wideband measurement whether or not to provide a more detailed channel quality reporting for a component carrier should be negligible for the system.

As an alternative exemplary embodiment of the invention, the indicator in the first channel quality field is incorporated into the RI feedback element. The RI is typically small, so that an RI value for a component carrier that resembles an "undefined" or "Out of Range" rank can be seen as the indicator that no further channel quality information elements for that component carrier are included in the second channel quality field. An example structure of a message for reporting channel quality information according to this exemplary embodiment of the invention is shown in FIG. 11. Compared to the embodiment of the invention described with respect to FIG. 10 above, it can be recognized that—at least when 3GPP LTE-based reporting modes are reused—an RI element is not always present in the channel quality feedback (cf. Table 1 above). Therefore this solution may be advantageously used when utilizing reporting modes where an RI element is present. Alternatively, an RI element may also be added to the other reporting modes. The implementation of such an "undefined" RI may for example be realized by introducing a new value which represents "undefined", or it could be implemented such that in the position where the receiver expects the RI information actually no signal is transmitted—then the receiver by means of e.g. power detection may be able to tell the difference between a defined RI value (e.g. between 1 and 8) where sufficient signal power is received and an undefined RI value in the case that not sufficient signal power is received.

The exemplary message in FIG. 11 is essentially similar to the exemplary message shown in FIG. 10. The messages only differ in that the first channel quality field 1101 of the message in FIG. 11 includes a WB RI element for each component carrier instead of a WB MCSI element as in FIG. 10. Accordingly, also the content of the respective sub-fields 1102-1, 1102-3 and 1102-4 of the second channel quality field 1102 is adapted accordingly, such that the respective channel quality measure comprises a WB MCSI element 1102-11 instead of an WB RI element 1002-11. Again, also the example in FIG. 11 assumes a reporting mode 3-1 as indicated in Table 1 for exemplary purposes.

In another embodiment of the invention, the WB MCSI and WB RI feedback are combined as the indicator in the first channel quality field. This is exemplarily shown in FIG. 12, where the channel quality measure in the respective sub-fields 1201-1 to 1201-5 in the first channel quality field 1201 consists of two channel quality elements, namely a WB MCSI element and a WB RI element.

Since generally a high transmission rank implies that the channel conditions are not catastrophic, it can be assumed the when a RI larger than 1 is reported the MCSI value should be well-defined, i.e. not "Out of Range". Therefore the joint transmission of a WB RI>1 and an e.g. WB MCSI value indicating "Out of Range" would not occur under normal circumstances when sending feedback in a communication system—rather a smaller RI should be chosen for which the MCSI value is well-defined (e.g. representing a non-zero spectral efficiency).

In the exemplary message shown in FIG. 12, the combination of a WB RI>1 and a WB MCSI indicating "Out of Range" is used to indicate for a component carrier that there is no additional channel quality information comprised in the second channel quality field 1202 for the given component carrier. Instead of using an RI representing a rank larger than 1, using only a single RI value representing e.g. the largest or second-but-largest possible transmission rank as an indication element may be preferable. Alternatively to using a WB RI>1 as part of the indication, also the combination of WB RI indicating an "undefined" rank and a WB MCSI indicating "Out of Range" could be used as an indication carrier that there is no additional channel quality information comprised in the second channel quality field 1202.

Similar to the messages shown in FIG. 10 and FIG. 11, also in the example given with respect to FIG. 12 it is assumed that there is a sub-field 1202-1, 1202-3, 1202-4 within the second channel quality filed 1202 for component carriers #1, #3 and #4. Accordingly, the channel quality measures in the sub-fields 1201-1, 1201-3, 1201-4 in the first channel quality field 1201 indicate combinations of WB RI elements and WB MCSI elements that indicate the presence of the corresponding sub-fields 1202-1, 1202-3, 1202-4 within the second channel quality filed 1202 for component carriers #1, #3 and #4. Assuming again a reporting mode 3-1 as shown in Table 1, the channel quality measure in the sub-fields 1202-1, 1202-3, 1202-4 within the second channel quality filed 1202 only need to indicate a WB PMI element and subband MCSI element(s), as the WB RI element and the WB MCSI element are already contained in the first channel quality field 1201.

It should be noted that FIGS. 9 to 12 show a logical ordering of all fields, sub-fields and elements. It should be noted that the ordering of fields, sub-fields and elements has no influence on the concept, as long as it is known to both ends of the feedback transmission e.g. by following a pre-defined procedure or a configured order.

Most of the exemplary embodiments of the invention described above have been related to the definition of the contents and structure of a message for conveying channel quality information only. Assuming that the message is sent in response to a corresponding trigger, e.g. a control message from the network via a L1/L2 control channel, the control signaling comprising the trigger may also allocate the physical channel resources for transmission of the message. Generally, it may be assumed that the transmitter of the message is assigned a certain amount of the physical channel resources for transmitting the message.

In 3GPP LTE and LTE-A the physical resources are typically designated by a number of resource blocks. Accordingly, when triggering an aperiodic channel quality report from a user equipment, the Node B will typically assign a number of resource blocks to the user equipment the user equipment is allowed to utilize in a sub-frame of the physical channel. This number of resource blocks is equivalent to a given number of modulation symbols that the user equipment is allowed to use within a sub-frame for the transmission of the channel quality feedback. The number of (uncoded) bits that can be transmitted within the given number of modulation symbols depends on the modulation scheme and the coding rate used for coding the bits of the message and for subsequently modulating the coded bits.

Generally, the number of uncoded bits that can be sent by the user equipment in a sub-frame can be calculated as follows:

$$T = N_{RB} \cdot CR \cdot MS$$

where T is the maximum number of uncoded bits of the message that can be sent according to the resource assignment, $N_{RB}$ the number of resource blocks the user equipment has been assigned within a sub-frame, CR the coding rate, i.e. the number of uncoded bits $M_{uncoded}$ divided by the number of coded bits $M_{coded}$, and MS the modulation scheme level, i.e. the number of coded bits mapped to a modulation symbol. For sake of simplicity, this formula does not take into account that parts of the resource blocks may be reserved for control signaling or reference symbols.

Obviously, the number of uncoded bits in the message should not exceed the number of T bits so as to fit the channel quality feedback within a single sub-frame transmission. If the number of uncoded bits the message is lower than the number of T bits, e.g. as user equipment is not reporting (detailed) channel quality information for some component carriers, different options exist how to fill the message so as to not waste any resource by transmitting dummy information.

The following list is a non-exhaustive enumeration of some possibilities for re-use of excess bits (the excess bits R can be determined by R=T−CQ, where CQ denoted the number of uncoded bits of the first and second channel quality fields) or to at least reduce the number of unused coded bits:

Variation of the code rate to obtain a desired fill rate of the message, i.e. using an available code rate out of a set of predetermined code rates closest to $CR=T/N_{RB} \cdot MS$ so that CQ→T and R consequently becomes small. In this case, the message only conveys channel quality information. The receiver of the message may for example perform a blind detection of the coding rate to decode the message.

Usage of the excess bits R for additional FEC/CRC for the sub-fields of the second channel quality field.

Usage of the excess bits R for additional feedback information. For example, if the indicator in the first channel quality field indicates the non-presence of further channel quality information for a component carrier in the second channel quality field, additional bits may be transmitted to inform the feedback receiver about the reason why no channel quality information is reported for that component carrier in the second channel quality field. Non-exhaustive examples for reasons are:

- user equipment is in DRX mode for that component carrier,
- user equipment cannot measure channel quality information because it is busy with other frequency measurements (e.g. known as "Measurement Gap" in 3GPP LTE),
- user equipment measures bad channel quality and therefore does not transmit further channel quality information,
- user equipment could not detect reference symbols on that component carrier that are required to measure the channel quality/channel quality information elements Usage of the excess bits R for additional granularity or additional channel quality information elements/values for other component carrier(s) which are reported in the second channel quality field. For example, additional or secondary PMI/MCSI elements(s) may be reported for another component carrier in case the primary PMI cannot be used by the network e.g. for interference reasons when the precoding is used for beamforming purposes. The PMI generally points to a precoding vector/matrix that should be applied for the transmission, and as such may depend on the transmission rank that is to be employed. For example in 3GPP LTE, the precoding codebook size and the precoding matrices depend on the transmission rank. Consequently also for the reporting the PMI value and its allowed value ranges or its size will generally depend on the RI value. Furthermore, due to multi-user scheduling restrictions in the network it may not always be possible to transmit to a terminal using the rank that was reported in the recent RI. It may therefore be beneficial to report a secondary RI that is for example reporting a lower value than the primary RI, which in turn may imply that secondary PMI/MCSI should be reported. Since generally it is easier for multi-user scheduling to use low rank transmissions, it may be preferable to transmit a secondary RI value that is smaller than the primary RI value. In such options, the first channel quality field preferably contains an indication for which component carrier such additional channel quality information is transmitted. As another example, the granularity of the MCSI values as shown in Table 3 could be extended to represent more values with higher or intermediate efficiency values. As another example, PMI values that cannot be represented by the usual PMI codebook as e.g. defined in the 3GPP LTE system could be indicated.

Usage of the excess bits R for higher resolution in the frequency domain for one or more component carriers on which CQI is reported in the second channel quality field. For example, the channel quality information could be obtained for a different subband size, so that for a given component carrier the channel quality feedback given is obtained for a first and also a second subband size.

As already indicated in the Technical Background section, there exists the possibility that two codewords are transmitted in a single transmission. In the previous exemplary embodiments, it has been exemplarily assumed that the channel quality information is reported for the case of a single codeword (CW) transmission mode from the feedback receiver (e.g. a NodeB) to the feedback transmitter (e.g. a UE). In case of e.g. a two-codeword transmission mode, the channel quality information feedback may contain two WB MCSI values instead of one as shown for example in FIG. 10, i.e. one for each of the codewords. This can be extended accordingly depending on the prevalent transmission mode or the configured reporting mode. For example, as outlined earlier, the reporting mode 3-1 in 3GPP LTE contains one WB MCSI per codeword and also one MCSI per subband per codeword.

In the following, some extensions for the multiple codeword channel quality information feedback according to further embodiment of the invention are discussed for the two-codeword case exemplarily based on the embodiment as having been outlined with respect to FIG. 10. Extensions to the other embodiments of the invention, as for example shown in FIG. 11 and FIG. 12, and for more than two should are of course also be envisioned and are straight-forward extensions of the options for the two-codewords case discussed in the following.

1. The first channel quality field contains WB MCSI for codeword 0 (CW0) only: If it is "Out of Range" (OoR), no further MCSI/PMI/RI for neither codeword are included in the second channel quality field. If it is not "Out of Range" (OoR), further MCSI/PMI/RI for codeword 0 (CW0) and all MCSI/PMI/RI (including wideband) for codeword 1 (CW1) are in the second channel quality field.
2. The first channel quality field contains WB MCSI for codeword 0 (CW0) and WB MCSI for CW1: If the WB MCSI for codeword 0 (CW0) and codeword 1 (CW1) are both "Out of Range" (OoR), neither further codeword 0 (CW0) nor further codeword 1 (CW1) MCSI/PMI/RI are included in the second channel quality field. Otherwise further codeword 0 (CW0) and codeword 1 (CW1) MCSI/PMI/RI are included in the second channel quality field.
3. The first channel quality field contains WB MCSI for codeword 0 (CW0) and WB MCSI for CW1: If WB MCSI for codeword 0 (CW0) is "Out of Range" (OoR), no further codeword 0 (CW0) MCSI/PMI/RI are included in the second channel quality field. Otherwise further codeword 0 (CW0) MCSI/PMI/RI are included in the second channel quality field. If WB MCSI for codeword 1 (CW1) is "Out of Range" (OoR), no further codeword 1 (CW1) MCSI/PMI/RI are included in the second channel quality field. Otherwise further codeword 1 (CW1) MCSI/PMI/RI are included in the second channel quality field.

Option 3 may be considered a solution "between" option 1 and option 2. WB MCSI elements for both codeword CW0 and CW1 are contained in the first channel quality field, but individually determine whether additional information for the respective codeword is included in the second channel quality field. This allows a finer granularity to reduce the channel quality information overhead. However it would not be beneficial in case the main motivation is to report that a component carrier cannot be measured—in such a case option 1 should be preferable because the payload in the first channel quality field is smaller than in option 3.

As may be apparent from the exemplary embodiments of the invention, the content of the first channel quality field is the decisive factor to indicate/determine the size and/or contents of the second channel quality field. Therefore, it may be beneficial to improve the error resilience against e.g. noise of the first channel quality field compared to the second channel quality field. This may be achieved for example by adding more FEC redundancy to the first channel quality field than for the second channel quality field. Additionally/alternatively, the first channel quality field and the second channel quality field may be encoded in separate code words, (optionally) using different FEC methods and/or code rates.

Moreover, the information of the first channel quality field could be transmitted on radio resources that are more reliable than those used for the information of the second channel quality field. This may for example be achieved by placing information of the first channel quality field in close proximity to reference symbols of a sub-frame, so that the quality of the channel estimation for the feedback message (particular for the first channel quality field) suffers from as small channel estimation errors as possible.

FIG. 10 and FIG. 12 mention the possibility that additional elements are moved from the second channel quality field into the first channel quality field. It should be understood that actually any element described herein with the second channel quality field could be moved into the first channel quality field and may be used as an indicator of the contents of the second channel quality field. For example, it may be beneficial to report a WB PMI element even if the WB MCSI is "Out of Range", for example in case the WB PMI feedback is used for beamforming purposes. Even though there may not be a transmission scheduled on this component carrier for a user equipment, the WB PMI or similar feedback may be useful for beamforming or angle-of-arrival (or for that matter angle-of-transmission) purposes. Consequently it may be preferable to include WB PMI information into the first channel quality field so that it is always transmitted for all component carriers.

Figure 13:
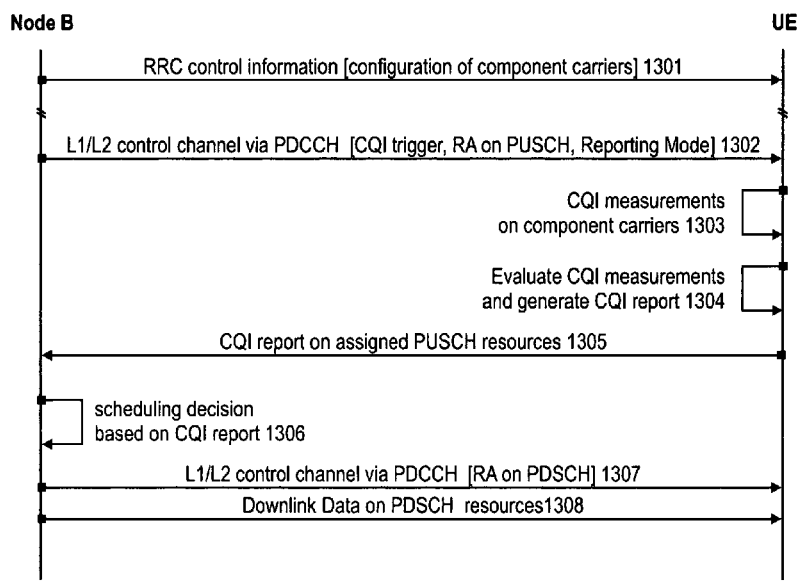
FIG. 13 shows an exemplary communication between a Node B and a UE within a 3GPP LTE or LTE-A system, where the Node B triggers a CQI report from the UE according to an embodiment of the invention.

In the following, an exemplary communication within a 3GPP LTE or LTE-A system is described, where a mobile terminal (UE) is triggered for sending channel quality feedback. FIG. 13 shows an exemplary communication between a Node B and a UE within a 3GPP LTE or LTE-A system, where the Node B triggers a CQI report from the UE according to an embodiment of the invention.

As indicated previously, it may be assumed that the component carriers that can be used for communication in the downlink may be predefined and fixed. Alternatively, the Node B may decide for its cell or for individual UEs, which component carriers should be available for communication. The component carriers that are available for communication could be for example indicated by related control signaling with system broadcast information (SBI) that are broadcast within each radio cell by their controlling Node Bs, in case the available component carriers are decided per radio cell. If the available component carriers are decided per radio bearer (service) of a user equipment, the available component carriers may be communicated 1301 to the user equipment by means of Radio Resource Control signaling, e.g. as part of the Radio Bearer Setup procedure. Also the reporting mode may be configured by the network in a similar fashion. The reporting mode may be configured per radio cell, per user equipment, or even per component carrier.

Generally, it is possible that the user equipments provide periodic channel quality feedback to the Node B. At least in 3GPP LTE, the periodic channel quality feedback is characterized by a very limited available CQI message size as provided by the assigned CQI message resources. In case the uplink capacity for reporting as detailed information as in the message formats for the CQI reports discussed herein is available, the periodic channel quality feedback may make use of the message formats for channel quality reporting described herein. As an example, for an available CQI message size that is sufficient to carry the first Channel Quality Field for all component carriers and the second Channel Quality Field for up to n component carriers, the formats and methods described herein may be employed where the CQI feedback transmitter on purpose sets the content of the first Channel Quality Field such that the second Channel Quality Field contains information pertaining to exactly or at most n component carriers.

In case the Node B intends to obtain an aperiodic CQI report on the channel quality, the Node B sends 1302 a corresponding trigger message to the user equipment (UE). In the example shown in FIG. 13, it is assumed that the trigger is sent vial L1/L2 control signaling (L1/L2 control channel) on the Physical Downlink Control CHannel (PDCCH) to the user equipment. Furthermore, it is exemplarily assumed that the trigger is sent together with an associated resource assignment (RA) for the transmission of the CQI report on the Physical Uplink Shared CHannel (PUSCH). The resource assignment indicates the resource blocks and the modulation and coding scheme for the transmission of the CQI report to the user equipment (unless the UE varies the coding rate to fill the CQI report—see the corresponding embodiment described previously herein—in this case only the assigned resource blocks and the modulation scheme need to be signaled).

The trigger may be triggering channel quality feedback on all component carriers that are available for communication. Alternatively, the trigger may trigger CQI reporting for individual component carriers only. For example, the trigger message sent 1302 by the Node B could include a bit map including for each available component carrier an associated trigger bit, which when set polls a CQI report for that component carrier.

In response to the trigger for a CQI report, the user equipment (UE) measures 1303 the channel quality on the respective component carriers for which the user equipment is not in DRX mode, respectively for which a CQI feedback should be provided. Such measurements are preferably relying on reference symbols that are transmitted by the Node B on known locations. The UE may execute for example correlation calculations and hypothesis calculations to obtain the RI, PMI, MCSI (as applicable) that should provide the highest spectral efficiency in the measured channel conditions. Subsequently, the user equipment evaluates 1304 the measurement results, and decides in which level of detail channel quality feedback is to be provided for the respective component carriers. Depending on the reporting mode (which determines the actual CQI elements that are applicable to be reported per component carrier) and its decision for which component carriers to report, the user equipment generates a CQI report using the CQI report format according to one of the different embodiments described herein (see for example FIG. 9 to FIG. 12). Depending on the CQI report format, the user equipment may optionally multiplex the CQI feedback with user data and/or additional control information within the CQI report. Subsequently, the user equipment transmits 1305 the generated CQI report to the Node B on the assigned uplink resources on the PUSCH.

Irrespective of whether a CQI report for all component carriers or for a subset of component carriers has been requested by the Node B, the first channel quality field of the CQI report always comprises a flag or channel quality measure for each available component carrier, so as to unambiguously identify the contents of the second channel quality field.

For example the Node B may have triggered a CQI report for component carriers #2 and #3 out of available component carriers #1 to #5. The user equipment may thus indicate in the respective sub-field for component carriers #1, #4, and #5 of the first channel quality field of the CQI report that no additional information for these component carriers is included in the second channel quality field. For component carriers #2 and #3 the user equipment may evaluate whether a full CQI reporting for the respective component carriers appears feasible in view of the measurement results and may decide whether it includes only CQI feedback in the first channel quality field of the CQI report for the given component carrier (i.e. no additional CQI information is included for the respective component carrier in the second channel quality field).

In an alternative implementation, the user equipment may always send CQI information in the first and second channel quality field for component carriers for which individual CQI reporting has been triggered. If CQI reporting is triggered for all available component carriers, the user equipment may freely decide on which component carriers more detailed CQI information is to be included in the second channel quality field of the CQI report.

Upon reception of the CQI report at the Node B, same will evaluate the CQI feedback and may use it for subsequent scheduling 1306 the user equipments within its radio cell. In the exemplary embodiment shown in FIG. 13, it is assumed that the Node B schedules the user equipment (UE) by sending 1307 a L1/L2 control channel with a resource assignment to the user equipment (UE) via the PDCCH and at the same time (i.e. within the same sub-frame as the resource assignment on the PDCCH) transmitting 1308 downlink data on the assigned PDSCH resources to the UE.

Another embodiment of the invention relates to the implementation of the above described various embodiments using hardware and software. It is recognized that the various embodiments of the invention may be implemented or performed using computing devices (processors) that are suitably controlled by executable instructions that cause the computing device to perform the functions according to the different embodiments of the invention described herein. A computing device or processor may for example be general purpose processors, digital signal processors (DSP), application specific integrated circuits (ASIC), field programmable gate arrays (FPGA) or other programmable logic devices, etc. The various embodiments of the invention may also be performed or embodied by a combination of these devices.

Further, the various embodiments of the invention may also be implemented by means of software modules, which are executed by a processor or directly in hardware. Also a combination of software modules and a hardware implementation may be possible. The software modules may be stored on any kind of computer-readable storage media, for example RAM, EPROM, EEPROM, flash memory, registers, hard disks, CD-ROM, DVD, etc.

Most of the embodiments have been outlined in relation to a 3GPP-based architecture of a communication system and the terminology used in the previous sections mainly relates to the 3GPP terminology. However, the terminology and the description of the various embodiments with respect to 3GPP-based architectures are not intended to limit the principles and ideas of the inventions to such systems only.

Also the detailed explanations given in the Technical Background section above are intended to better understand the mostly 3GPP specific exemplary embodiments described herein and should not be understood as limiting the invention to the described specific implementations of processes and functions in the mobile communication network. Nevertheless, the improvements proposed herein may be readily applied in the architectures described in the Technical Background section. Furthermore, the concept of the invention may be also readily used in the LTE RAN currently and its enhancements (LTE-A) discussed by the 3GPP.

In the previous paragraphs various embodiments of the invention and variations thereof have been described. It would be appreciated by a person skilled in the art that numerous variations and/or modifications may be made to the present invention as shown in the specific embodiments without departing from the spirit or scope of the invention as broadly described.

The invention claimed is:

1. A method for transmitting a message in a communications system with configured carrier aggregation of multiple component carriers, the method comprising the following steps:
receiving control signalling allocating a resource on an air interface,
generating a message for reporting a channel quality of the communication system for multiple component carriers, the message comprising:
a first channel quality field consisting of a known number of bits, and
a second channel quality field consisting of a variable number of bits, wherein the number of bits and structure of the second channel quality field is indicated by the content of the bits of the first channel quality field; and
transmitting the message on the allocated resource,
wherein the first channel quality field consists of a number of sub-fields, wherein each sub-field is associated to a respective component carrier and wherein the number of sub-fields is defined by the number of component carriers available for communication between a base station and a communication terminal,
the size of the respective sub-fields of the first channel quality field depends on a reporting mode out of a plurality of channel quality reporting modes used for a respective component carrier, and
the second channel quality field is divided into a number of sub-fields, wherein the size of each sub-field of the second channel quality field depends on a reporting mode out of the plurality channel quality reporting modes used for the component carrier associated to the respective sub-field of the second channel quality field.

2. The method according to claim 1, further comprising a further field for conveying control information and/or user data.

3. The method according to claim 1, wherein the first channel quality field indicates a first quality measure for each of a plurality of component carriers, and further indicates for each of the component carriers whether or not the second channel quality field comprises a further second channel quality measure pertaining to the respective component carrier.

4. The method according to claim 3, wherein the first channel quality field further indicates whether or not the second channel quality field comprises further control information related to the respective component carrier.

5. The method according claim 1, wherein the known number of bits of the first channel quality field depends on the number of component carriers available for communication between a base station and a communication terminal.

6. The method according to claim 1, wherein the first channel quality field contains a plurality of flags, each flag being associated to a respective component carrier of a plurality of component carriers available for communication between a base station and a terminal,
wherein each flag of the first channel quality field indicates whether or not a channel quality measure for a respective component carrier is present in the second channel quality field.

7. The method according to claim 1, wherein the first channel quality field contains a plurality of channel quality measures, each channel quality measure providing a channel quality measure of a respective component carrier of a plurality of component carriers available for communication between a base station and a terminal,
   wherein each channel quality measure of the first channel quality field indicates whether or not a further second channel quality measure for a respective component carrier is present in the second channel quality field.

8. The method according to claim 1, wherein a channel quality measure of a respective component carrier comprised in the first channel quality field consists of a wideband modulation and coding scheme indicator (WB MCSI) and/or a wideband rank indicator (WB RI).

9. The method according to claim 8, wherein no further channel quality measure of a component carrier is comprised in the second channel quality field, if the wideband modulation and coding scheme indicator or the wideband rank indicator for the component carrier indicates "out of range".

10. The method according to claim 1, wherein a plurality of component carriers are available for communication between a base station and a terminal, and wherein the method further comprises:
   the step of receiving control signalling configuring a reporting mode out of a plurality of channel quality reporting modes for each of the component carriers, wherein the transmitted message is generated according to the reporting mode configured for the individual component carriers.

11. The method according to claim 1, further comprising the steps of:
   measuring of channel quality of at least a subset of a plurality of component carriers available for communication between a base station and a terminal, thereby obtaining channel quality measures for the component carriers,
   deciding for a respective component carrier for which the channel quality has been measured, whether to include a further channel quality measure for the respective component carrier in the second channel quality field of the message based on the channel quality measurement result,
   wherein the decision for the respective component carrier influences the content of the generated message.

12. The method according to claim 11, wherein measuring the channel quality for a respective component carrier comprises performing a wideband measurement on the entire bandwidth of the component carrier and
   wherein the decision whether to include a channel quality measure to the second channel quality field of the message for the respective component carrier is based on the result of the wideband measurement.

13. The method according to claim 11, wherein measuring the channel quality for a respective component carrier comprises determining a wideband modulation and coding scheme indicator and/or a wideband rank indicator for a respective component carrier.

14. The method according to claim 1, further comprising the step of signalling the component carriers available for communication from the network to a mobile terminal.

15. The method according to claim 1, wherein the control signalling allocating the resource on an air interface indicates the total number of coded bits T of the message, and the method further comprises the step of adapting the coding rate for encoding the bits of the first and the second channel quality field such that the equation $$T = CQ_1 + CQ_2$$

is satisfied, wherein $CQ_1$ is the number of coded bits of the first channel quality field and $CQ_2$ is the number of coded bits of the second channel quality field.

16. The method according to claim 1, wherein the control signalling allocating the resource on an air interface indicates the total number of coded bits T of the message, and the method further comprises the step of adding coded control information bits and/or coded user data bits to the message such that the equation $$T = R + CQ_1 + CQ_2$$

is satisfied, wherein R is the number of coded control information bits and/or coded user data bits, $CQ_1$ is the number of coded bits of the first channel quality field and $CQ_2$ is the number of coded bits of the second channel quality field.

17. The method according to claim 16, wherein the control signalling allocating the resource on an air interface further indicates a modulation scheme, and the method further comprises the step of modulating the coded bits of the message according to the modulation scheme.

18. The method according to claim 1, wherein the method is performed by a communication terminal in a discontinued reception mode for one of a plurality of component carriers available for communication with a base station, and wherein the communication terminal indicates in the first channel quality field of the message that no further channel quality information for the component carrier for which the terminal is in discontinued reception mode is transmitted in the second channel quality field of the message.

19. A communication terminal for transmitting a message via an air interface of a communication system with configured carrier aggregation of multiple component carriers to a base station, the terminal comprising:
   a receiver for receiving control signalling allocating a resource on an air interface,
   a processing unit for generating a message for reporting a channel quality of the communication system for multiple component carriers, the message comprising:
   a first channel quality field consisting of a known number of bits, and
   a second channel quality field consisting of a variable number of bits, wherein the number of bits and structure of the second channel quality field is indicated by the content of the bits of the first channel quality field; and
   a transmitter for transmitting the message on the allocated resource to the base station,
   wherein the message comprises:
   a first channel quality field consisting of a known number of bits and containing a plurality of channel quality measures, each channel quality measure providing a channel quality measure of a respective component carrier of a plurality of component carriers available for communication between a base station and a terminal, wherein the first channel quality field consists of a number of sub-fields, wherein each sub-field is associated to a respective component carrier and wherein the number of sub-fields is defined by the number of component carriers available for communication between a base station and a communication terminal, and
   a second channel quality field consisting of a variable number of bits, wherein the number of bits and structure of the second channel quality field is indicated by the content of the bits of the first channel quality field, wherein each channel quality measure of the first channel quality field indicates whether or not a further second channel quality measure for a respective component carrier is present in the second channel quality field, wherein a channel quality measure of a respective component carrier comprised in the first channel quality field consists of a wide band modulation and coding scheme indicator and/or a wide band rank indicator and no further channel quality measure of said component carrier is comprised in the second channel quality field, if the wideband modulation and coding scheme indicator or the wideband rank indicator for the component carrier indicates "out of range" or "undefined", wherein the rank indicator indicates the rank of the transmission matrix to be employed for multi-antenna transmission.

20. A base station for transmitting a message via an air interface of a communication system with configured carrier aggregation of multiple component carriers to a communication terminal, the base station comprising:
a transmitter for transmitting control signalling allocating a resource on an air interface,
a processing unit for generating a message for reporting a channel quality of the communication system for multiple component carriers, the message comprising:
a first channel quality field consisting of a known number of bits, and
a second channel quality field consisting of a variable number of bits, wherein the number of bits and structure of the second channel quality field is indicated by the content of the bits of the first channel quality field, and
a transmitter for transmitting the message on the allocated resource to the communication terminal,
wherein the message comprises:
a first channel quality field consisting of a known number of bits and containing a plurality of channel quality measures, each channel quality measure providing a channel quality measure of a respective component carrier of a plurality of component carriers available for communication between a base station and a terminal, wherein the first channel quality field consists of a number of sub-fields, wherein each sub-field is associated to a respective component carrier and wherein the number of sub-fields is defined by the number of component carriers available for communication between a base station and a communication terminal, and
a second channel quality field consisting of a variable number of bits, wherein the number of bits and structure of the second channel quality field is indicated by the content of the bits of the first channel quality field, wherein each channel quality measure of the first channel quality field indicates whether or not a further second channel quality measure for a respective component carrier is present in the second channel quality field,
wherein a channel quality measure of a respective component carrier comprised in the first channel quality field consists of a wide band modulation and coding scheme indicator and/or a wide band rank indicator and no further channel quality measure of said component carrier is comprised in the second channel quality field, if the wideband modulation and coding scheme indicator or the wideband rank indicator for the component carrier indicates "out of range" or "undefined", wherein the rank indicator indicates the rank of the transmission matrix to be employed for multi-antenna transmission.

21. A method for transmitting a message in a communication system with configured carrier aggregation of multiple component carriers, the method comprising the following steps:
receiving control signalling allocating an resource on an air interface,
generating a message for reporting a channel quality of a communication system supporting carrier aggregation and operation on multiple component carriers, the message comprising:
a first channel quality field consisting of a known number of bits and containing a plurality of channel quality measures, each channel quality measure providing a channel quality measure of a respective component carrier of a plurality of component carriers available for communication between a base station and a terminal, wherein the first channel quality field consists of a number of sub-fields, wherein each sub-field is associated to a respective component carrier and wherein the number of sub-fields is defined by the number of component carriers available for communication between a base station and a communication terminal, and
a second channel quality field consisting of a variable number of bits, wherein the number of bits and structure of the second channel quality field is indicated by the content of the bits of the first channel quality field, wherein each channel quality measure of the first channel quality field indicates whether or not a further second channel quality measure for a respective component carrier is present in the second channel quality field,
wherein a channel quality measure of a respective component carrier comprised in the first channel quality field consists of a wide band modulation and coding scheme indicator and/or a wide band rank indicator and no further channel quality measure of said component carrier is comprised in the second channel quality field, if the wideband modulation and coding scheme indicator or the wideband rank indicator for the component carrier indicates "out of range" or "undefined", wherein the rank indicator indicates the rank of the transmission matrix to be employed for multi-antenna transmission, and
transmitting the message on the allocated resource.

22. The method according to claim 1, wherein each of said multiple component carriers comprises subcarriers, resource blocks, and resource block groups,
wherein a subcarrier is a smallest frequency resource in said communications system, a resource block is a smallest allocable unit for multiple subcarriers, and a resource block group is a group of said resource blocks.

23. The communication terminal according to claim 19, wherein each of said multiple component carriers comprises subcarriers, resource blocks, and resource block groups,
wherein a subcarrier is a smallest frequency resource in said communications system, a resource block is a smallest allocable unit for multiple subcarriers, and a resource block group is a group of said resource blocks.

24. The base station according to claim 20, wherein each of said multiple component carriers comprises subcarriers, resource blocks, and resource block groups,
wherein a subcarrier is a smallest frequency resource in said communications system, a resource block is a smallest allocable unit for multiple subcarriers, and a resource block group is a group of said resource blocks.

* * * * *